(No Model.)

J. D. MATTISON.
ROLLER BEARING AXLE BOX.

No. 527,121. Patented Oct. 9, 1894.

Witnesses:

Inventor
J. D. Mattison
By James Shelby
Attorney (No Model.) 3 Sheets—Sheet 2.
J. D. MATTISON.
ROLLER BEARING AXLE BOX.
No. 527,121. Patented Oct. 9, 1894.
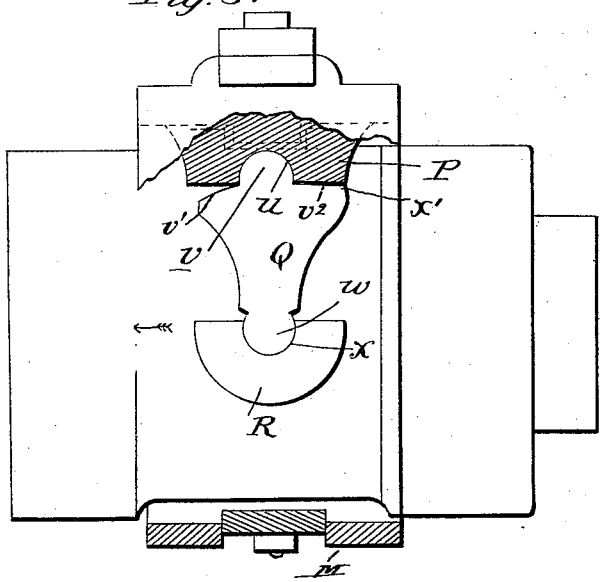
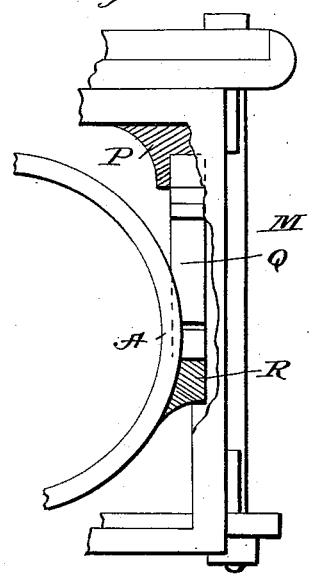
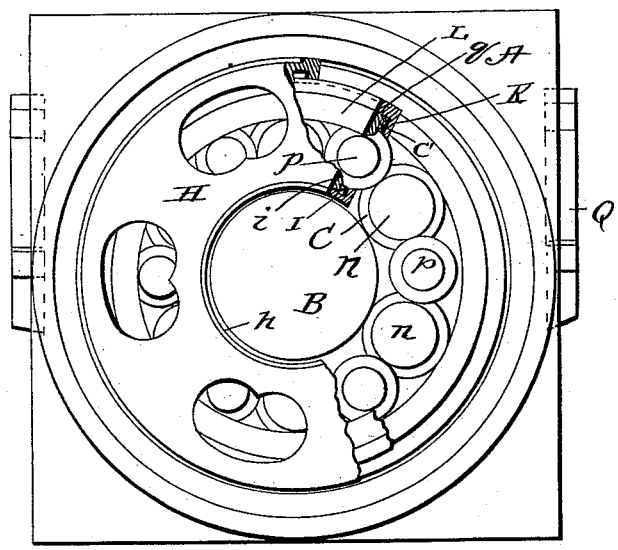
Witnesses:
Inventor (No Model.)  
3 Sheets—Sheet 3.

J. D. MATTISON.
ROLLER BEARING AXLE BOX.

No. 527,121. Patented Oct. 9, 1894.

Witnesses:  
Inventor

UNITED STATES PATENT OFFICE.

JAMES D. MATTISON, OF SAGINAW, MICHIGAN.

ROLLER-BEARING AXLE-BOX.

SPECIFICATION forming part of Letters Patent No. 527,121, dated October 9, 1894.

Application filed May 29, 1893. Serial No. 475,992. (No model.)

*To all whom it may concern:*

Be it known that I, JAMES D. MATTISON, a citizen of the United States, residing at Saginaw, (East Side,) in the county of Saginaw and State of Michigan, have invented certain new and useful Improvements in Roller-Bearing Axle-Boxes; and I do declare the following to be a full, clear, and exact description of the invention, such as will enable others skilled in the art to which it appertains to make and use the same.

My invention relates to improvements in that class of anti-friction, roller bearing, axle boxes in which a series of bearing rollers and a series of intermediate or separating rollers are employed in conjunction with a shaft or journal; and it has for one of its objects to provide a box of the character stated embodying such a construction and arrangement of parts that sliding friction and consequent wear of the parts will be absolutely prevented without the use of lubricants.

Another object of the invention is to provide means whereby the bearing rollers may be adjusted with respect to the shaft or journal, independent of the intermediate rollers; and means whereby the intermediate rollers may be adjusted and adjustably fixed so as to hold them and the bearing rollers in their proper positions.

Another object of the invention is to provide bearings or tracks for the intermediate rollers, separate from and independent of the heads of the box, so as to prevent disaster in case the heads become disconnected or are forced off by a severe endwise thrust of the journal.

Still another object is to so mount the box in a frame connected to a truck, that it (the box) is adapted, when a car is turning a curve or other place where one track is higher than the other, to assume an angle of inclination corresponding to that of the axle and thereby prevent undue strain and frictional wear of the parts.

Other objects and advantages of the invention will be fully understood from the following description and claims when taken in connection with the annexed drawings, in which—

Figure 1:
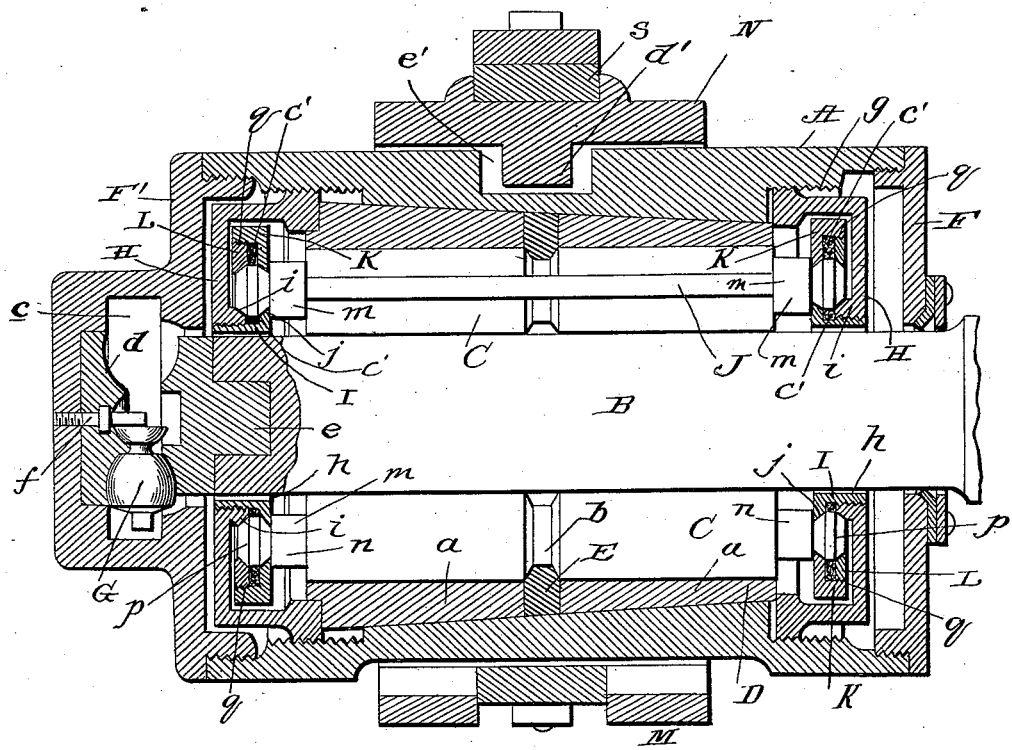
Figure 2:
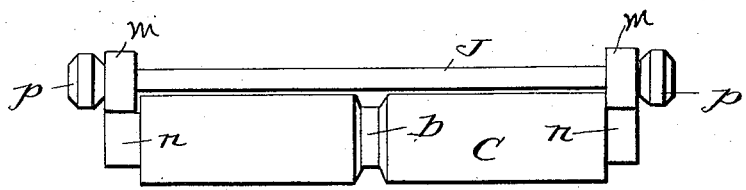
Figure 6:
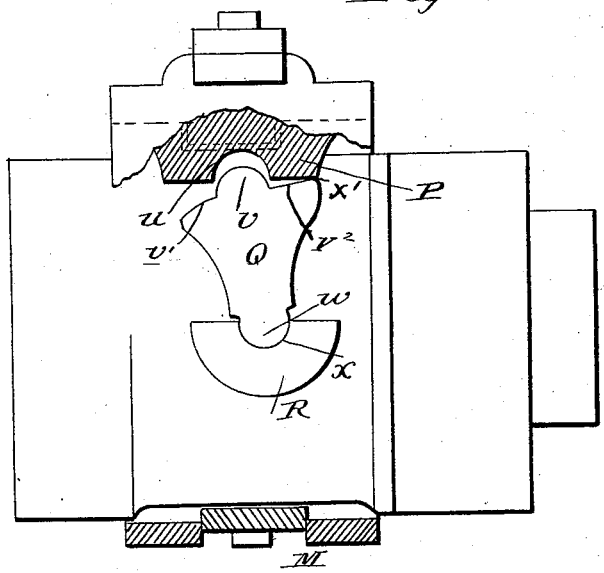

Figure 1, is a vertical, diametrical section of an axle box embodying my invention. Fig. 2, is a detail view illustrating one of the bearing rollers and one of the intermediate rollers in their proper relative positions. Fig. 3, is a side elevation of the box with parts broken away. Fig. 4, is a detail end elevation of the box with parts broken away to better illustrate the manner of mounting the box. Fig. 5, is an elevation of the inner end of the box with the head removed and parts broken away, and Fig. 6, is a view similar to Fig. 3.

In the drawings, similar letters designate corresponding parts throughout the several views, referring to which—

A, indicates the box of my improved bearing.

B, indicates the journal.

C, indicates the bearing rollers, and D, indicates the beveled housing for adjusting the bearing rollers independent of the intermediate rollers, and holding the said bearing rollers against the journal.

The housing D, which is made in two sections $a, a$, (see Fig. 1,) is preferably split longitudinally so as to permit it to be sprung upon the rollers, and it serves to hold the rib E, which is also split and is designed and adapted to engage the peripheral grooves $b$, of the rollers C, so as to hold said rollers against longitudinal play.

F, F', indicate the inner and outer heads of the box, which are threaded to engage the interiorly threaded ends of the same and are provided with central apertures for the passage of the journal, as illustrated. The outer head F', is provided upon its outer side with a chamber $c$, which surrounds its central aperture as illustrated; and in this chamber $c$, is arranged a disk $d$, of hardened steel, which is provided with a circular groove and is designed in conjunction with a similar disk $e$, on the end of the journal, to be engaged by an anti-friction roller G. This roller G, is designed to prevent frictional wear of the journal and box head F', and is preferably of the form shown; and it is held against radial displacement or movement by the central pin $f$, which also serves to connect the disk $d$, to the head F', as illustrated.

As better illustrated in Fig. 1, the interior of the intermediate portion or body of the box A, is tapered or reduced in diameter from its outer to its inner end for the engagement of the beveled housing D, before described; and said housing D, is forced to its seat so as to crowd the rollers C, against the journal, by the exteriorly threaded ring H, which engages the interior threads $g$, of the box, as shown. This ring H, and a corresponding ring H, at the opposite end of the box, are preferably of an angular form in cross-section as illustrated, and they are provided with central apertures $h$, for the passage of the journal and with the inwardly directed beveled flanges $i$, which latter are designed to form stationary bearings for the ends of the intermediate or separating rollers J. Thus it will be seen that the intermediate rollers J, and the bearing rollers C, are entirely independent of the heads of the box, and should one or both of said heads be forced off by a severe endwise thrust of the journal, the intermediate and bearing rollers would remain undisturbed and a casualty would be averted.

The intermediate rollers J, are preferably reduced in diameter for the greater portion of their length as better illustrated in Fig. 2, but they are provided adjacent to their ends with enlargements $m$, which are designed to engage the reduced ends $n$, of the bearing rollers, as shown. The said rollers J, are also provided at their ends with enlargements $p$, which have their edges beveled and are designed to be engaged by the rings I, K, and L, as better shown in Fig. 1.

The rings I, which rest within and engage the threaded apertures $h$, of the rings H, are provided with beveled flanges $j$, at their inner edges to engage the beveled enlargements $p$, of the rollers J, as shown. These rings I, serve in conjunction with the rings H, to form the inner bearings of the rollers J, while the rings K, L, serve to retain the said rollers J, in position as illustrated. Both of the rings K, L, have their inner edges beveled, as shown, and the rings L, have their outer edges threaded to engage the lateral, threaded flanges $q$, of the rings K, whereby it will be seen that the said rings K, L, may be carried closer together to move the rollers J, toward the journal and take up frictional wear or may be moved apart to permit the said rollers J, to move away from the journal. The inner rings I, are also adjustable and they are designed to be adjusted in conjunction with the rings K, L, for the purpose before described.

In order to prevent the objectionable rattling noise so common to roller bearings, I prefer to provide packing rings as $c'$, between the rings K, and L, and the rings H, and I. These packing rings which may be formed from any suitable material, engage the enlargements $p$, of the intermediate rollers as illustrated, and serve effectually to accomplish the purpose stated.

M, indicates a frame which surrounds the box A, and serves to connect the same to a car truck. This frame M, has a projection $d'$, designed to engage a groove or recess $e'$, in the top of the box A, and it is slotted at its lower end as shown to receive the tie-bar or arm of truck and has a recess in its upper cross-bar N, to seat the arch bar $s$, of a freight car truck, but, as is obvious I do not desire to be confined to this construction as the frame M, may be connected to the truck of a passenger car or coach in any approved manner.

As better shown in Fig. 4, of the drawings the frame M, is provided in its upper corners with shoes or bearing blocks P, which are provided in their under sides with curvilinear seats $u$, designed to receive the reduced and rounded upper ends $v$, of the rocking arms Q. These arms Q, also have their lower ends reduced and rounded as shown at $w$, to engage the curvilinear seats $x$, of the projections R, of the box A, and they serve to permit the box to rock in the frame M, in order that it (the box) may assume an angle of inclination corresponding to that of the journal in rounding a curve or the like so as to prevent undue strain and frictional wear, and may also have a lateral movement to cushion end thrust.

It will be noted from the foregoing description taken in connection with the drawings that my improved bearing is simple, and durable and that it reduces friction and consequently frictional wear to a minimum; and it will also be seen that all of the parts are so arranged and mounted that no material damage can be done by a severe endwise thrust of the journal or by the same assuming an angle of inclination, which is a desideratum.

As better shown in Fig. 3, of the drawings, the arms Q, are provided on opposite sides of the ends $v$, with shoulders $v'$, $v^2$. The shoulders $v'$, are curved as shown, but the shoulders $v^2$, are straight or approximately straight, whereby it will be seen that when the journal B, and the box A, are thrust endwise and outward, as when the car is turning a curve, the corners $x'$, of the arms will engage the under side of the blocks P, and the weight of the car will rest upon the said corners with the arms in the position shown in Fig. 6. Consequently, it will be seen that, when the end thrust ceases, the weight of the car will return the box to its normal position and the upper ends $v$, of the arms to their seats $u$. The shoulders $v'$, of the arms Q, are curved as before stated so as to enable the box to follow the journal when the thrust is in the direction of the arrow in Fig. 3.

Having described my invention, what I claim is—

1. In an anti-friction roller bearing, the combination of a box, a series of bearing rollers having their ends reduced, and a series of intermediate or separating rollers having enlargements $m$, to engage the reduced ends of the bearing rollers and also having the beveled enlargements $p$, of the rings H, connected to the box and having a beveled flange resting within and engaging the beveled enlargements $p$ of the intermediate rollers, the adjustable rings I, connected to the rings H, and resting within the intermediate rollers and having beveled surfaces to engage the enlargements $p$, the rings K, arranged around the intermediate rollers and having their inner edges beveled to engage the enlargements $p$, and also having the lateral threaded flanges, and the rings L engaging the threads of the rings K, and having their inner edges beveled to engage the beveled enlargements $p$, all substantially as and for the purpose set forth.

2. In an anti-friction roller bearing, the combination with a box having its ends recessed and threaded and also having the intermediate portion of its interior reduced in diameter from its outer to its inner end, and the heads connected to the box and having central apertures for the passage of a journal or shaft; of the bearing rollers arranged in the box, a beveled housing interposed between the bearing rollers and the box and rings H, engaging the threads of the box and the housing, substantially as and for the purpose set forth.

3. In an anti-friction roller bearing, the combination with a box having its ends recessed and threaded and also having the intermediate portion of its interior reduced in diameter from its outer to its inner end, and the heads connected to the box and having central apertures for the passage of a journal or shaft; of the bearing rollers arranged in the box and having their ends reduced, a beveled housing interposed between the bearing rollers and the box, a series of intermediate or separating rollers having enlargements $m$, to engage the reduced ends of the bearing rollers and also having the beveled enlargements $p$, the rings H, engaging the threads of the box and having a beveled flange resting within and engaging the beveled enlargements $p$ of the intermediate rollers, the adjustable rings I, connected to the rings H, and resting within the intermediate rollers and having beveled surfaces to engage the enlargements $p$, the rings K, arranged around the intermediate rollers and having their inner edges beveled to engage the enlargements $p$, and also having the lateral threaded flanges and the rings L, engaging the threads of the rings K, and having their inner edges beveled to engage the beveled enlargements $p$, all substantially as and for the purposes set forth.

4. In a bearing, the combination with a frame having a projection depending from its upper cross bar and also having blocks or shoes in its upper corners provided with curvilinear seats or sockets; of a box arranged loosely in said frame and having a groove or recess in its upper side to receive the projection of the frame, and also having projections on its opposite sides, provided with curvilinear seats or sockets; of the rocking arms Q, having the upper rounded ends $v$, engaging the seats or sockets of the frame and also having the lower rounded ends to engage the seats or sockets of the box, all substantially as and for the purpose set forth.

5. In a bearing, the combination with a frame having blocks or shoes in its upper corners provided with curvilinear seats or sockets, and a box arranged loosely in said frame and having projections on its opposite sides provided with curvilinear seats or sockets; of the rocking arms Q, having the upper rounded ends $v$, engaging the seats or sockets of the frame and the lower rounded ends engaging the seats or sockets of the box and also having the straight or approximately straight shoulders $v^2$, at one side of the ends $v$, and the curved shoulders $v'$, at the opposite side of said ends $v$, substantially as and for the purpose specified.

In testimony whereof I affix my signature in presence of two witnesses.

JAMES D. MATTISON.

Witnesses:
SETH T. GODDARD,
JOHN E. NOLAN.